(12) United States Patent
Shigeyoshi (10) Patent No.: US 7,999,208 B2
(45) Date of Patent: *Aug. 16, 2011

(54) ROBOT CONTROL UNIT FOR CONTROLLING TANDEM ARC WELDING SYSTEM, AND ARC-SENSOR CONTROL METHOD USING THE UNIT

(75) Inventor: Masayuki Shigeyoshi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 994 days.

This patent is subject to a terminal disclaimer.

(21) Appl. No.: 11/852,777

(22) Filed: Sep. 10, 2007

(65) Prior Publication Data

US 2008/0083716 A1    Apr. 10, 2008

(30) Foreign Application Priority Data

Oct. 6, 2006    (JP) .................... 2006-275044

(51) Int. Cl.
*B23K 9/12*    (2006.01)
*G05B 19/18*    (2006.01)

(52) U.S. Cl. ................. 219/125.12; 219/125.1; 700/253

(58) Field of Classification Search ............... 219/125.1, 219/125.12; 700/56, 61, 250, 253
See application file for complete search history.

(56) References Cited

U.S. PATENT DOCUMENTS

| | | | | |
|---|---|---|---|---|
| 4,417,126 A * | 11/1983 | Kasahara et al. | ........ | 219/124.22 |
| 4,782,155 A * | 11/1988 | Nakagawa et al. | ........... | 546/147 |
| 6,000,598 A | 12/1999 | Moon | | |
| 6,429,405 B2 * | 8/2002 | Belloni et al. | ........... | 219/124.34 |
| 2009/0179021 A1 * | 7/2009 | Nishimura et al. | ........... | 219/136 |

FOREIGN PATENT DOCUMENTS

| | | | |
|---|---|---|---|
| JP | 05069147 A | * | 3/1993 |
| JP | 2005-144476 | | 6/2005 |
| JP | 2005-254242 | | 9/2005 |
| JP | 2005254242 A | * | 9/2005 |
| KR | 10-0200639 | | 3/1999 |
| KR | 10-0695939 | | 3/2007 |

OTHER PUBLICATIONS

Hyeon et al., The rotary arc welded ball moving method using rotational phase welding current data (Machine Assisted Translation—MAT),Mar. 2007, Korean Intellectual Propert Office, whole document.*

* cited by examiner

*Primary Examiner* — Stephen J Ralis
(74) *Attorney, Agent, or Firm* — Oblon, Spivak, McClelland, Maier & Neustadt, L.L.P.

(57) ABSTRACT

A robot control unit for controlling a tandem arc welding system, which has a welding torch, a robot for weaving the welding torch, a leading electrode power supply, and a trailing electrode power supply, includes a leading electrode detection section and a trailing electrode detection section for detecting quantity of welding state during weaving; a leading electrode processing section for calculating amounts of electrical change; a leading electrode correction section for calculating correction amounts for correcting displacement in horizontal and vertical directions from a weld line of a weaving center trajectory based on the amounts of electrical change; a trailing electrode processing section for calculating an amount of electrical change; and a trailing electrode correction section for calculating a correction amount for correcting displacement in a rotational direction from the weld line of the weaving center trajectory based on the amount of electrical change.

13 Claims, 9 Drawing Sheets

FIG. 3 lw: LEFTWARD WEAVING
rw: RIGHTWARD WEAVING

ROBOT CONTROL UNIT FOR CONTROLLING TANDEM ARC WELDING SYSTEM, AND ARC-SENSOR CONTROL METHOD USING THE UNIT

BACKGROUND OF THE INVENTION

1. Field of the Invention

The present invention relates to a robot control unit for controlling a tandem arc welding system that performs arc welding of a V-groove, an L-groove, or a groove like that by advancing a welding torch having two electrodes along a weld line while weaving the welding torch right and left using a robot; and an arc-sensor control method using this unit.

2. Description of Related Art

Usually, the tandem arc welding system automatically performs welding by using the robot control unit and the like, wherein teaching of an operation trajectory is previously performed, and a stored teaching trajectory (weld line) is reproduced, that is, so-called arc-sensor control is performed for welding operation. Here, the arc-sensor control refers to processing for a weaving center trajectory of a welding torch to correctly follow a teaching trajectory. As a related art on arc-sensor control during arc welding, JP-A-2005-254242 is given. The JP-A-2005-254242 describes a robot control unit for controlling a tandem arc welding system that detects quantity of welding state of each of two electrodes (leading electrode and trailing electrode) attached to a tip of the robot, corrects a trajectory of the robot in a horizontal direction based on the quantity of welding state of one of the leading and trailing electrodes, and corrects the trajectory of the robot in a vertical direction based on the quantity of welding state of the other electrode.

SUMMARY OF THE INVENTION

Figure 10:
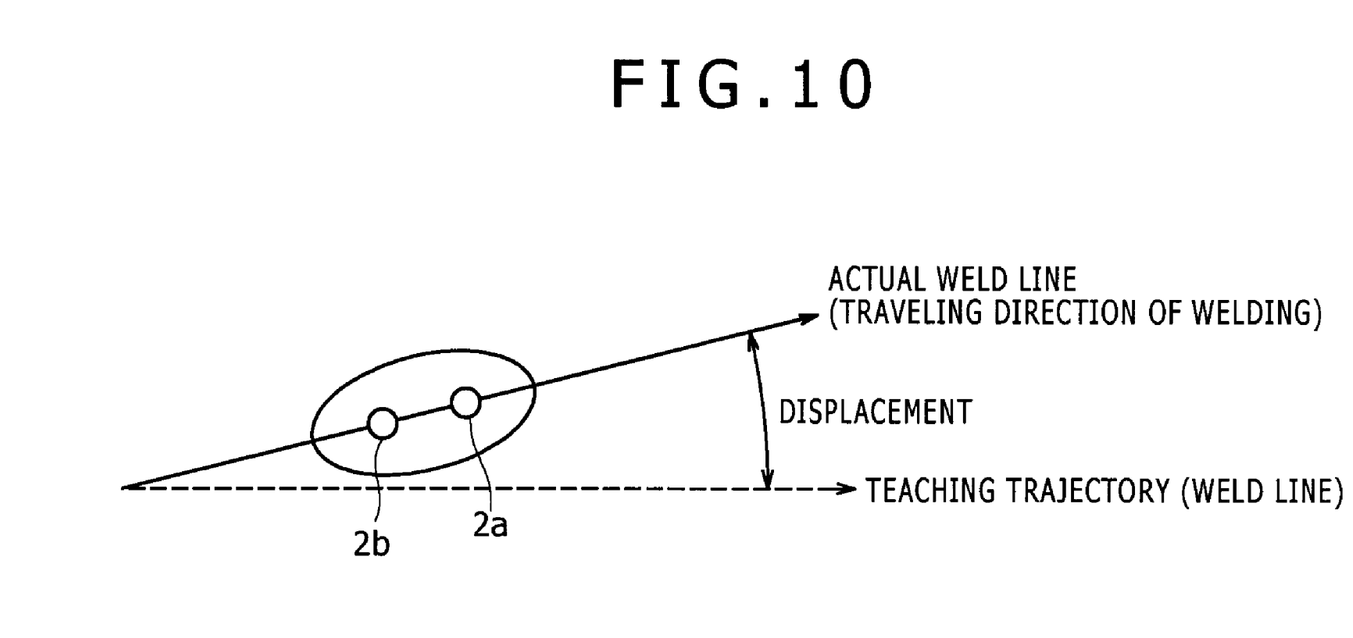
FIG. 10 is an explanatory diagram showing a condition of arc-sensor control in a usual tandem arc welding system.

However, in the case of a welded structure, particularly a large welded structure (hereinafter, welding work), displacement from a teaching trajectory (weld line) occurs in an actual weld line due to a positioning error of a welding work itself, an attachment error of each member, and thermal strain during welding, and the like. Such displacement includes not only displacement in a case that the actual line is displaced parallel to the teaching trajectory (weld line), but also displacement in a case that the actual line is displaced obliquely to the trajectory as shown in FIG. 10. In this case, there has been a difficulty that even if a leading electrode $2a$ follows the teaching trajectory (weld line) by an effect of arc-sensor control for correcting the robot trajectory in a horizontal direction, a trailing electrode $2b$ may deviate from the teaching trajectory (weld line), leading to low accuracy of arc-sensor control. As a result, welding defects are produced due to such arc-sensor control with low accuracy.

In view of foregoing, it is desirable to provide a robot control unit for controlling a tandem arc welding system, by which arc welding can be performed, the arc welding being excellent in accuracy of arc-sensor control, and hard to produce welding defects, and provide an arc-sensor control method using the unit.

An embodiment of the invention includes a robot control unit for controlling a position of a welding torch in a tandem arc welding system that has the welding torch having a leading electrode and a trailing electrode at a tip, a robot that is attached with the welding torch, and weaves the welding torch right and left with respect to a travelling direction of welding, and a leading electrode power supply and a trailing electrode power supply for supplying power to the leading electrode and the trailing electrode; and performs arc welding along a weld line, the robot control unit including the following:

a leading electrode detection section for detecting quantity of welding state during weaving the leading electrode; a trailing electrode detection section for detecting quantity of welding state during weaving the trailing electrode; a leading electrode processing section for calculating amounts of electrical change from the quantity of welding state detected by the leading electrode detection section; a leading electrode correction section for calculating correction amounts for correcting displacement in horizontal and vertical directions from the weld line of a weaving center trajectory based on the amounts of electrical change calculated by the leading electrode processing section; a trailing electrode processing section for calculating an amount of electrical change from the quantity of welding state detected by the trailing electrode detection section; and a trailing electrode correction section for calculating a correction amount for correcting displacement in a rotational direction from the weld line of the weaving center trajectory based on the amount of electrical change calculated by the trailing electrode processing section.

According to the above configuration, since arc-sensor control for controlling the welding torch in the horizontal and vertical directions with respect to the travelling direction is performed with the correction amount calculated by the leading electrode correction section, and arc-sensor control for controlling the welding torch in a rotational direction with respect to the travelling direction is performed with the correction amount calculated by the trailing electrode correction section, the welding torch is improved in accuracy of arc-sensor control.

Moreover, an embodiment of the invention includes an arc-sensor control method using the robot control unit, the method including the following steps: a leading electrode control step that, during one cycle of weaving, in the leading electrode processing section, amounts of electrical change are calculated from the quantity of welding state detected by the leading electrode detection section, and assumed to be a first change amount of leading electrode and a second change amount of leading electrode respectively, and in the leading electrode correction section, a horizontal correction amount of leading electrode for correcting horizontal displacement from the weld line of a weaving center trajectory is calculated based on the first change amount of leading electrode, and a vertical correction amount of leading electrode for correcting vertical displacement from the weld line of the weaving center trajectory is calculated based on the second change amount of leading electrode, and the welding torch is controlled in horizontal and vertical directions with respect to the travelling direction with the horizontal correction amount of leading electrode and the vertical correction amount of leading electrode; and a trailing electrode control step, which is performed concurrently with or following the leading electrode control step, that, during the one cycle of weaving, in the trailing electrode processing section, an amount of electrical change is calculated from the quantity of welding state detected by the trailing electrode detection section and assumed to be a change amount of trailing electrode, and in the trailing electrode correction section, a correction amount of trailing electrode for correcting rotational displacement from the weld line of the weaving center trajectory is calculated based on the change amount of trailing electrode, and the welding torch is controlled in a rotational direction with respect to the travelling direction with the correction amount of trailing electrode.

According to the above procedure, the leading electrode control step and the trailing electrode control step are performed concurrently or successively, thereby arc-sensor control for controlling the welding torch in horizontal, vertical, and rotational directions with respect to the travelling direction is performed, and therefore the welding torch is improved in accuracy of arc-sensor control.

In the arc-sensor control method of an embodiment of the invention, the leading electrode control step can be designed such that a welding current value is used as the quantity of welding state, and the second change amount of leading electrode corresponds to difference between an average welding current value of the leading electrode detected during one cycle of weaving, and a previously set, reference welding current value.

According to the above procedure, the amount of electrical change during weaving of the leading electrode is accurately calculated, and accuracy of the vertical correction amount of leading electrode is improved, as a result, accuracy of arc-sensor control is further improved.

In the arc-sensor control method of an embodiment of the invention, the leading electrode control step can be designed such that the first change amount of leading electrode corresponds to difference between quantity of left end welding state of the leading electrode detected at a left end of weaving, and quantity of right end welding state of the leading electrode detected at a right end of weaving.

According to the above procedure, the amount of electrical change during weaving of the leading electrode is accurately calculated, and accuracy of the horizontal correction amount of leading electrode is improved, as a result, accuracy of arc-sensor control is further improved.

In the arc-sensor control method of an embodiment of the invention, the leading electrode control step can be designed such that the first change amount of leading electrode corresponds to difference between first difference in quantity of welding state and second difference in quantity of welding state, and the first difference in quantity of welding state is defined as difference between rightward maximum quantity of welding state and rightward minimum quantity of welding state of the leading electrode, which are detected during a rightward weaving period from a left end to a right end of weaving, and the second difference in quantity of welding state is defined as difference between leftward maximum quantity of welding state and leftward minimum quantity of welding state of the leading electrode, which are detected during a leftward weaving period from the right end to the left end of weaving.

According to the above procedure, the amount of electrical change during weaving of the leading electrode is accurately calculated, and accuracy of the horizontal correction amount of leading electrode is improved, as a result, accuracy of arc-sensor control is further improved.

In the arc-sensor control method of an embodiment of the invention, the trailing electrode control step can be designed such that the change amount of trailing electrode corresponds to difference between quantity of left end welding state of the trailing electrode detected at a left end of weaving, and quantity of right end welding state of the trailing electrode detected at a right end of weaving.

According to the above procedure, the amount of electrical change during weaving of the trailing electrode is accurately calculated, and accuracy of the correction amount of trailing electrode is improved, as a result, accuracy of arc-sensor control is further improved.

In the arc-sensor control method of an embodiment of the invention, the trailing electrode control step can be designed such that the change amount of trailing electrode corresponds to difference between third difference in quantity of welding state and fourth difference in quantity of welding state, and the third difference in quantity of welding state is defined as difference between rightward maximum quantity of welding state and rightward minimum quantity of welding state of the trailing electrode, which are detected during a rightward weaving period from a left end to a right end of weaving, and the fourth difference in quantity of welding state is defined as difference between leftward maximum quantity of welding state and leftward minimum quantity of welding state of the trailing electrode, which are detected during a leftward weaving period from the right end to the left end of weaving.

According to the above procedure, the amount of electrical change during weaving of the trailing electrode is accurately calculated, and accuracy of a horizontal correction amount of trailing electrode is improved, as a result, accuracy of arc-sensor control is further improved.

In the arc-sensor control method of an embodiment of the invention, the leading electrode control step can be designed such that the vertical correction amount of leading electrode is in proportion to magnitude of the second change amount of leading electrode.

According to the above procedure, accuracy of the vertical correction amount of leading electrode is improved, as a result, accuracy of arc-sensor control is further improved.

In the arc-sensor control method of an embodiment of the invention, the leading electrode control step can be designed such that the horizontal correction amount of leading electrode is in proportion to magnitude of the first change amount of leading electrode.

According to the above procedure, accuracy of the horizontal correction amount of leading electrode is improved, as a result, accuracy of arc-sensor control is further improved.

In the arc-sensor control method of an embodiment of the invention, the trailing electrode control step can be designed such that the correction amount of trailing electrode is in proportion to magnitude of the change amount of trailing electrode.

According to the above procedure, accuracy of the correction amount of trailing electrode is improved, as a result, accuracy of arc-sensor control is further improved.

In the arc-sensor control method of an embodiment of the invention, the leading electrode control step can be designed such that the vertical correction amount of leading electrode is set to be zero before the second change amount of leading electrode exceeds a predetermined threshold value, and the vertical correction amount is set to be a predetermined, certain amount when the second change amount of leading electrode exceeds the threshold value.

According to the above procedure, accuracy of the vertical correction amount of leading electrode is improved, as a result, accuracy of arc-sensor control is further improved.

In the arc-sensor control method of an embodiment of the invention, the leading electrode control step can be designed such that the horizontal correction amount of leading electrode is set to be zero before the first change amount of leading electrode exceeds a predetermined threshold value, and the horizontal correction amount is set to be a predetermined, certain amount when the first change amount of leading electrode exceeds the threshold value.

According to the above procedure, accuracy of the horizontal correction amount of leading electrode is improved, as a result, accuracy of arc-sensor control is further improved.

In the arc-sensor control method of an embodiment of the invention, the trailing electrode control step can be designed such that the correction amount of trailing electrode is set to be zero before the change amount of trailing electrode exceeds a predetermined threshold value, and the correction amount is set to be a predetermined, certain amount when the change amount of trailing electrode exceeds the threshold value.

According to the above procedure, accuracy of the correction amount of trailing electrode is improved, as a result, accuracy of arc-sensor control is improved.

According to the robot control unit according to an embodiment of the invention, arc welding can be performed, which is excellent in accuracy of arc-sensor control, and hardly produces welding defects.

According to the arc-sensor control method using the robot control unit according to an embodiment of the invention, arc welding can be performed, which is excellent in accuracy of arc-sensor control, in addition, hardly produces welding defects. Moreover, a calculation method of at least one of the first change amount of leading electrode, second change amount of leading electrode, and change amount of trailing electrode, or at least one of the horizontal correction amount of leading electrode, vertical correction amount of leading electrode, and correction amount of trailing electrode is specified, thereby arc welding can be performed, which is further excellent in accuracy of arc-sensor control, in addition, further hardly produces welding defects.

DESCRIPTION OF THE PREFERRED EMBODIMENT

A robot control unit for controlling a tandem arc welding system according to an embodiment of the invention is described with reference to drawings.

Figure 1:
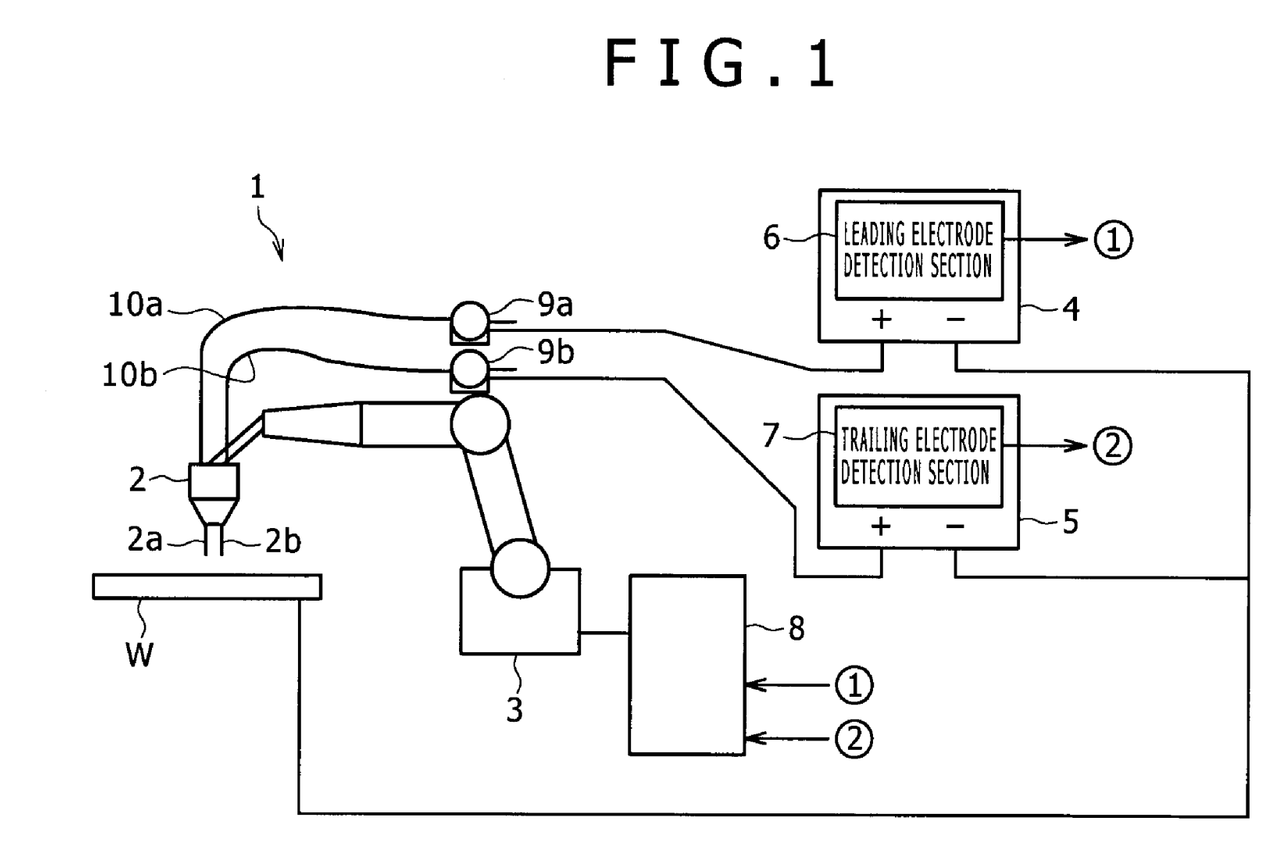
FIG. 1 is an explanatory block diagram showing an example of a tandem arc welding system.

First, the tandem arc welding system controlled by the robot control unit according to an embodiment of the invention is described. In the tandem arc welding system, arc welding is performed along a weld line while weaving two electrodes right and left with respect to a traveling direction of a welding work. As shown in FIG. 1, the tandem arc welding system 1 has a welding torch 2 having a leading electrode 2a and a trailing electrode 2b, robot 3, leading electrode power supply 4, trailing electrode power supply 5, leading electrode detection section 6, and trailing electrode detection section 7. Hereinafter, respective configurations are described.

At a tip of the welding torch 2, the torch has the leading electrode 2a disposed in the front in the traveling direction of the welding work W, and the trailing electrode 2b disposed in the back in the traveling direction with a predetermined distance (for example, 10 to 30 mm) from the leading electrode 2a. The leading electrode 2a and the trailing electrode 2b act as consumable electrodes, wherein welding wires 10a and 10b are inserted into the insides of a tubular leading electrode torch and a tubular trailing electrode torch (not shown), and projected from tips of the respective torches with a predetermined extension (preferably 20 to 35 mm). The welding wires 10a and 10b are fed from wire feeders 9a and 9b. As the welding wires 10a and 10b, a wire having a certain composition is appropriately selected depending on material of the welding work W, a welding mode and the like. For example, a wire may be used, which contains a certain amount of C, Si, Mn, Ti, S and O, and the remainder including Fe and inevitable impurities.

The welding torch 2 may have a shield gas nozzle. As a shield gas, a gas having a composition being rich in inert gas is used, including $Ar+CO_2$, $Ar+He+O$, $Ar+He+CO_2$.

Figure 3:
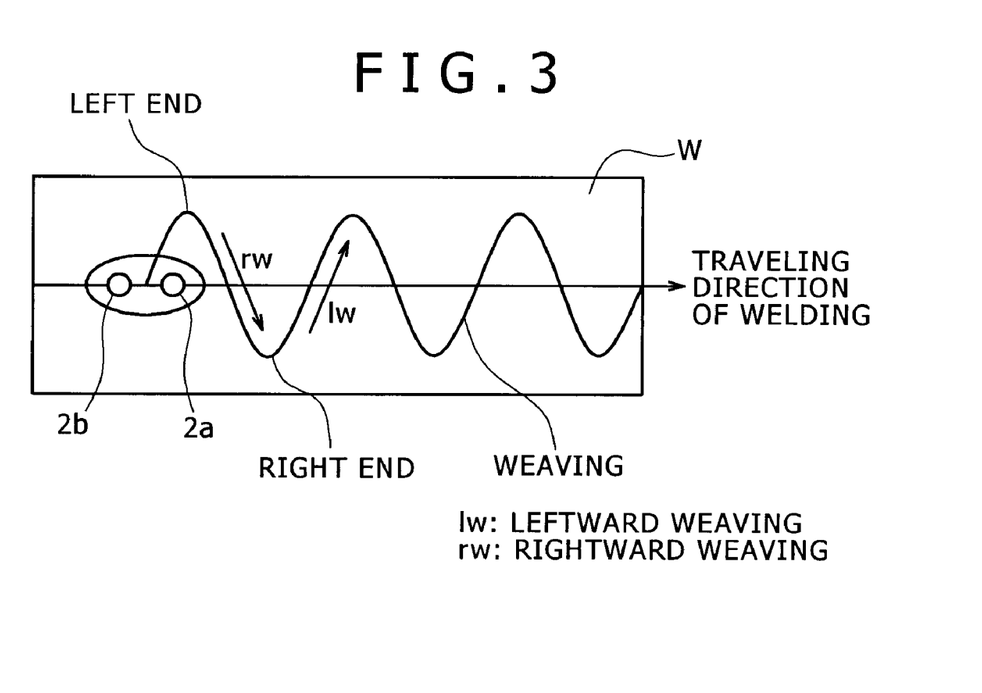
FIG. 3 is an explanatory diagram showing a condition of weaving of a welding torch in the tandem arc welding system.

The robot 3 is attached with the welding torch 2 at a tip, and weaves the welding torch 2 right and left with respect to the traveling direction during arc welding (see FIG. 3). Control of the weaving is performed by driving respective axes of the robot 3, and a robot control unit 8 described later is used for the control.

The leading electrode power supply 4 and the trailing electrode power supply 5 supply power to the leading electrode 2a, trailing electrode 2b, and welding work W in order to generate arc between the leading electrode 2a and the welding work W, and between the trailing electrode 2b and the welding work W.

The leading electrode detection section 6 and the trailing electrode detection section 7 detect certain positions of the leading electrode 2a and the trailing electrode 2b during weaving, for example, detect quantity of welding state of each of left and right ends of weaving. While description is made on an example where the leading electrode detection section 6 and the trailing electrode detection section 7 are provided in the inside of the leading electrode power supply 4 and the trailing electrode power supply 5 respectively in FIG. 1, they may be provided in the outside of the leading electrode power supply 4 and the trailing electrode power supply 5 respectively.

Figure 2:
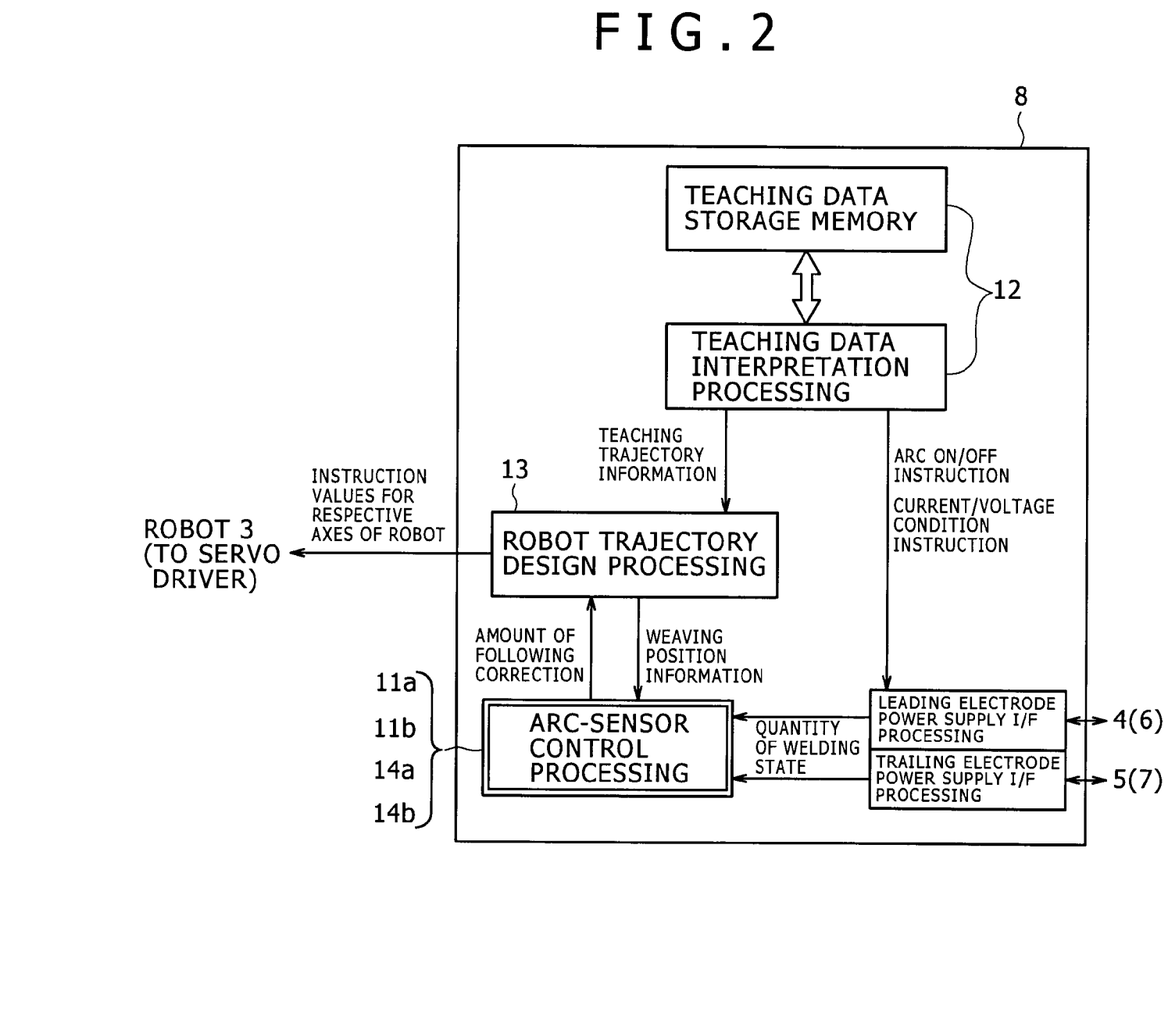
FIG. 2 is a block diagram of a robot control unit for controlling the tandem arc welding system according to an embodiment of the invention.

The robot control unit 8 according to the invention controls a position of the welding torch 2 in the tandem arc welding system, and controls a position of the welding torch 2 via the robot 3 based on the quantity of welding state detected by each of the leading electrode detection section 6 and the trailing electrode detection section 7. Specifically, the unit corrects positions in horizontal and vertical directions of a weaving center trajectory using amounts of electrical change of the leading electrode 2a, and corrects a position in a rotational direction of the weaving center trajectory using an amount of electrical change of the trailing electrode 2b. As shown in FIG. 2, the robot control unit 8 has a leading electrode processing section 11a, leading electrode correction section 14a, trailing electrode processing section 11b, and trailing electrode correction section 14b.

The leading electrode processing section 11a and the trailing electrode processing section 11b calculate the amounts of electrical change by a certain calculation method from data of the quantity of welding state detected by each of the leading electrode detection section 6 and the trailing electrode detection section 7 at a relevant position based on weaving position information from a robot trajectory design processing section 13, for example, information on whether the torch is at a left end or a right end of weaving, or information on whether current weaving is rightward weaving or leftward weaving. The certain calculation method includes, for example, a method of calculating difference in amount of welding state between respective positions as described later, or a method of calculating an average amount of welding state, and then calculating difference between the average amount of welding state and a reference amount of welding state.

The leading electrode correction section 14a and the trailing electrode correction section 14b calculate amounts of correction (amount of following correction) for controlling displacement in horizontal, vertical, and rotational directions of the weaving center trajectory by a certain calculation method based on the amounts of electrical change from the leading electrode processing section 11a and the trailing electrode processing section 11b. The certain calculation method includes, for example, a method of calculating the amounts by using a proportional relationship as described later, or a method of calculating the amounts by using a threshold value. The calculated amounts of correction (amounts of following correction) are sent to the robot trajectory design processing section 13.

Figure 4:
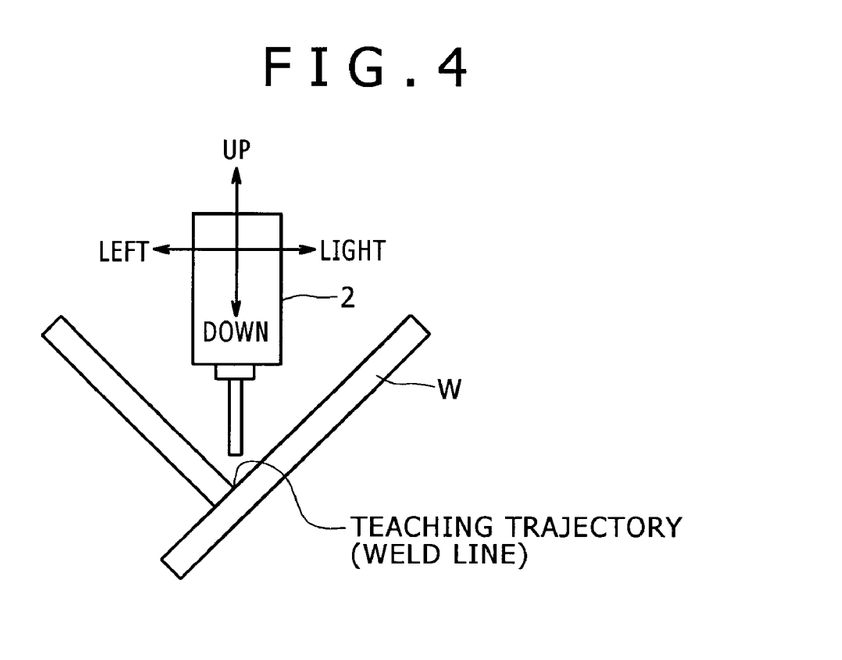
FIG. 4 is an explanatory diagram showing a condition of arc-sensor control using the robot control unit according to an embodiment of the invention.
Figure 5:
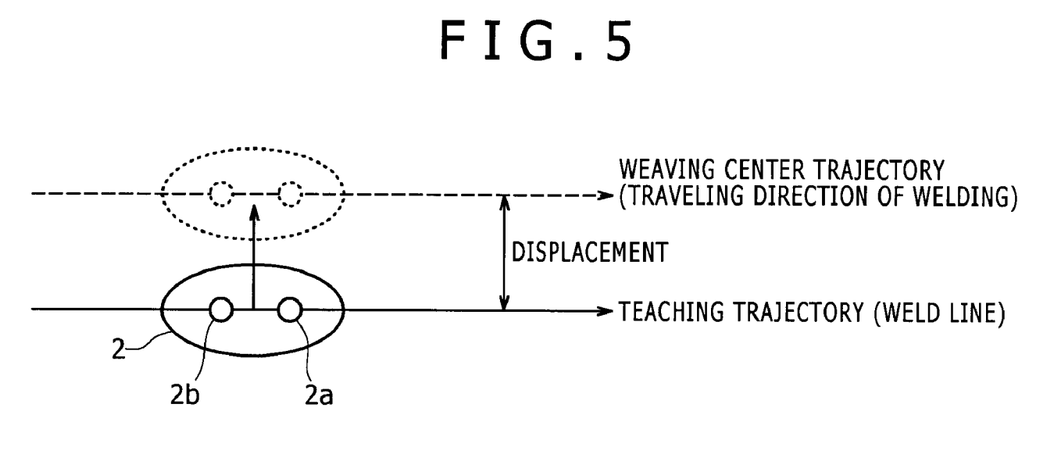
FIG. 5 is an explanatory diagram showing a condition of arc-sensor control in a horizontal direction using the robot control unit according to an embodiment of the invention.
Figure 6:
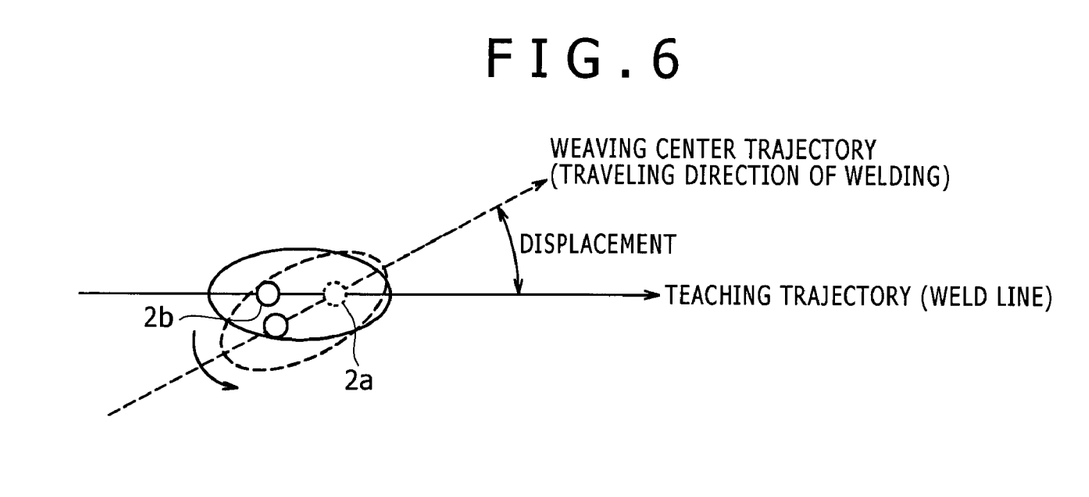
FIG. 6 is an explanatory diagram showing a condition of arc-sensor control in a rotational direction using the robot control unit according to an embodiment of the invention.

The robot trajectory design processing section 13 corrects teaching position data sent from a teaching data section 12 with the amounts of following correction sent from the leading electrode correction section 14a and the trailing electrode correction section 14b, and sends such corrected data to the robot 3 (servo drive) as instruction values for respective axes of the robot 3 in order to control the welding torch 2 attached to the tip of the robot 3 in the horizontal, vertical, and rotational directions with respect to the traveling direction (see FIGS. 4 to 6).

In the tandem arc welding system according to an embodiment of the invention, a welding current and/or a welding voltage are used as the quantity of welding state. For the correction of displacement in the vertical direction of the weaving center trajectory, the welding current is used. For the correction of displacement in the horizontal direction of the weaving center trajectory, the welding current or the welding voltage is used. At that time, when response in constant voltage control of a welding power supply is relatively fast to a weaving cycle, the welding current is used, and when it is relatively slow, the welding voltage is used. In some cases, both the welding current and welding voltage are used.

Arc-Sensor Control Method

Figure 7A:
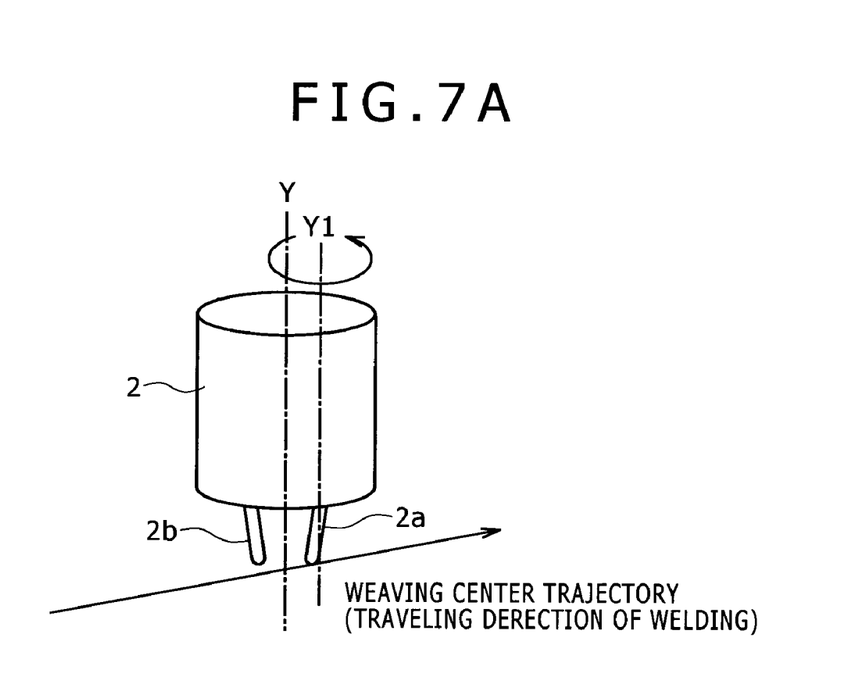
FIG. 7A is a perspective view showing the condition of arc-sensor control in the rotational direction of FIG. 6.
Figure 7B:
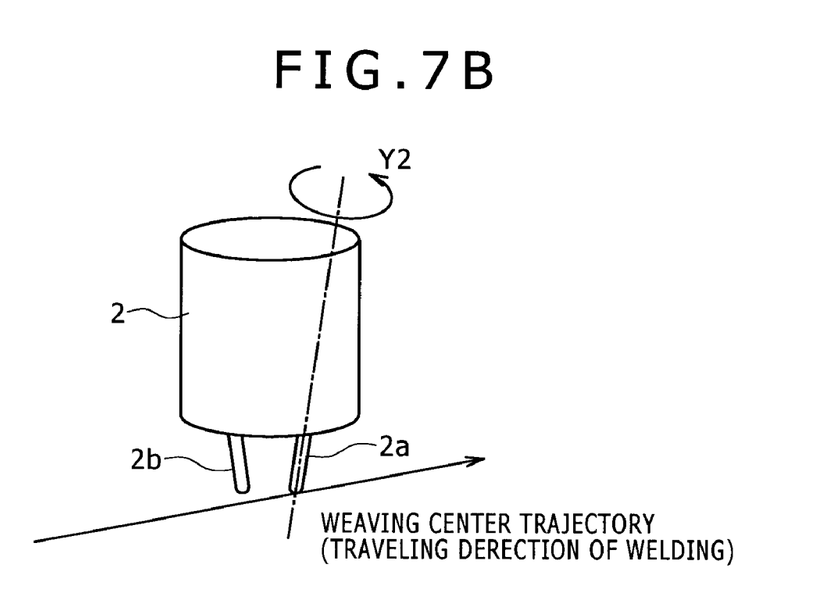
FIG. 7B is another perspective view showing the condition of arc-sensor control in the rotational direction of FIG. 6.
Figure 8A:
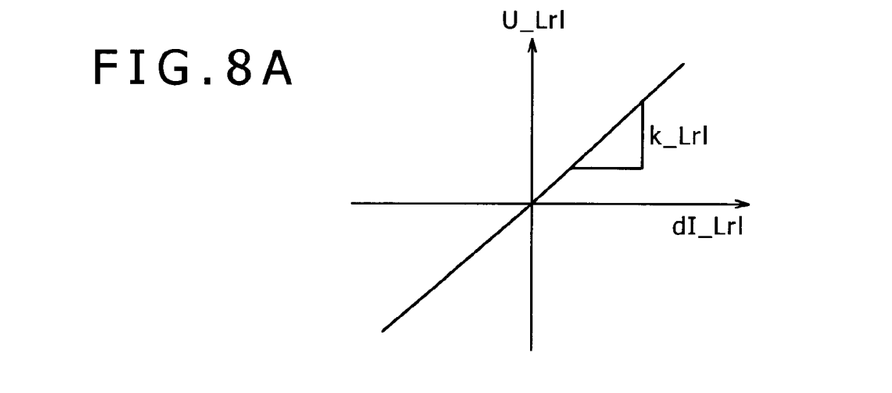
FIG. 8A is a graphical representation showing a relationship between first change amount of leading electrode and horizontal correction amount of leading electrode in an arc-sensor control method according to an embodiment of the invention.
Figure 8B:
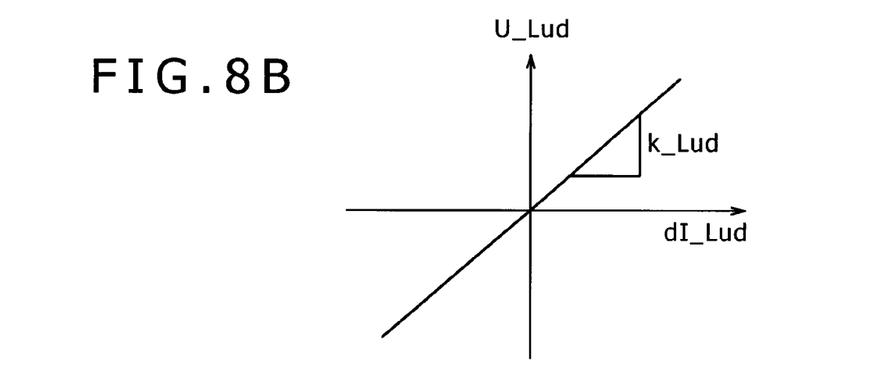
FIG. 8B is a graphical representation showing a relationship between second change amount of leading electrode and vertical correction amount of leading electrode in the arc-sensor control method.
Figure 8C:
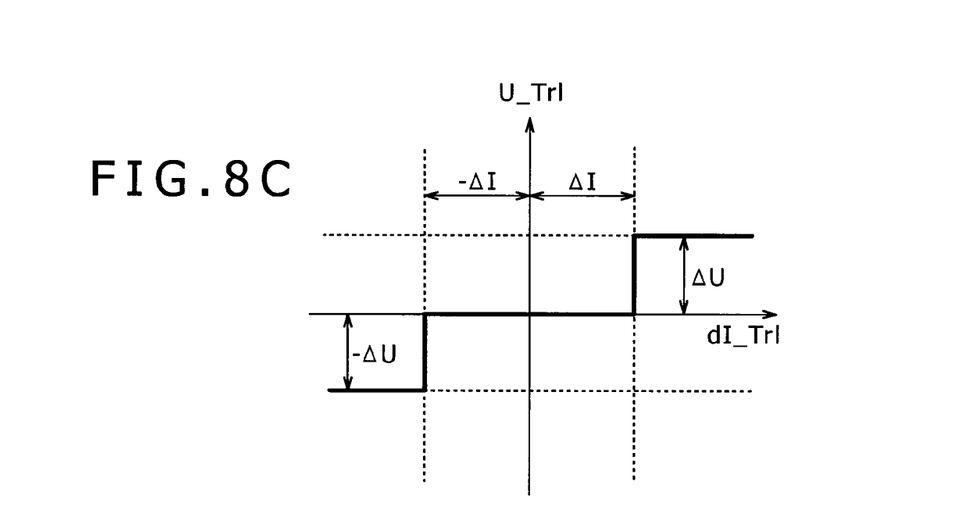
FIG. 8C is a graphical representation showing a relationship between change amount of trailing electrode and correction amount of trailing electrode in the arc-sensor control method.
Figure 9:
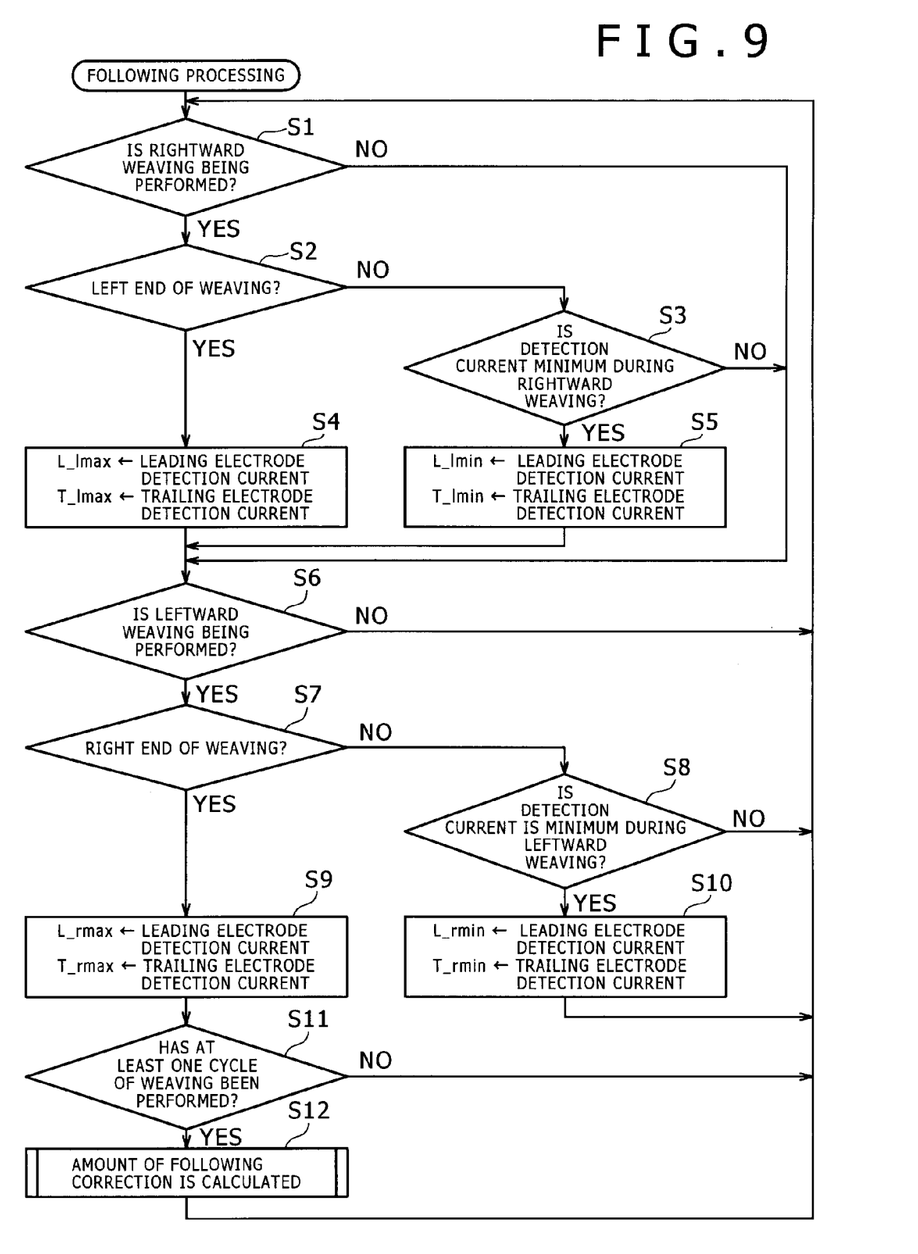
FIG. 9 is a processing flowchart for explaining the arc-sensor control method using the robot control unit according to an embodiment of the invention.

Next, an arc-sensor control method using the robot control unit according to an embodiment of the invention is described with reference to drawings. FIGS. 7A and 7B are perspective diagrams showing a condition of arc-sensor control in a rotational direction of FIG. 6, FIG. 8A is a graphical representation showing a relationship between a first change amount of leading electrode and a horizontal correction amount of leading electrode in the arc-sensor control method, FIG. 8B is a graphical representation showing a relationship between a second change amount of leading electrode and a vertical correction amount of leading electrode in the method, FIG. 8C is a graphical representation showing a relationship between a change amount of trailing electrode and a correction amount of trailing electrode in the method, and FIG. 9 is a processing flowchart for explaining the arc-sensor control method.

The arc-sensor control method according to an embodiment of the invention includes a leading electrode control step and a trailing electrode control step. The trailing electrode control step is performed concurrently with or following the leading electrode control step.

(1) Leading Electrode Control Step

In the leading electrode control step, during one cycle of weaving, amounts of electrical change are calculated by a certain calculation method from the quantity of welding state detected in the leading electrode and assumed to be the first change amount of leading electrode and the second change amount of leading electrode respectively, and a horizontal correction amount of leading electrode for correcting horizontal displacement of the weaving center trajectory is calculated by a certain calculation method based on the first change amount of leading electrode, and a vertical correction amount of leading electrode for correcting vertical displacement of the weaving center trajectory is calculated by a certain calculation method based on the second change amount of leading electrode. Then, the welding torch in the tandem arc welding system is controlled in horizontal and vertical directions with respect to the travelling direction with the horizontal correction amount of leading electrode and the vertical correction amount of leading electrode (see FIGS. 4 and 5).

First Change Amount of Leading Electrode

The first change amount of leading electrode is preferably calculated by one of the following, two calculation methods.

In the first calculation method, the first change amount of leading electrode (dI_Lrl) is assumed to correspond to difference between quantity of left-end welding state of the leading electrode (L_A) detected at a left end of weaving, and quantity of right-end welding state of the leading electrode (L_B) detected at a right end of weaving, as shown in the following expression (1).

$$[dI\_Lrl]=[L\_B]-[L\_A] \quad (1)$$

In the second calculation method, the first change amount of leading electrode (dI_Lrl) is assumed to be difference between first difference in quantity of welding state and second difference in quantity of welding state, as shown in the following expression (2). The first difference in quantity of welding state is defined as difference between rightward maximum quantity of welding state (L_lmax) and rightward minimum quantity of welding state (L_lmin) of the leading electrode, which are detected during a period of rightward weaving rw from the left end to the right end of weaving (see FIG. 3). The second difference in quantity of welding state is defined as difference between leftward maximum quantity of welding state (L_rmax) and leftward minimum quantity of welding state (L_rmin) of the leading electrode, which are detected during a period of leftward weaving lw from the right end to the left end of weaving (see FIG. 3).

$$[dI\_Lrl]=([L\_lmax]-[L\_lmin])-([L\_rmax]-[L\_rmin]) \quad (2)$$

Second Change Amount of Leading Electrode

The second change amount of leading electrode (dI_Lud) is preferably calculated by a calculation method of the following expression (3). That is, a welding current value is used as the quantity of welding state, and the second change amount is assumed to correspond to difference between an average welding current value of the leading electrode detected during one cycle of weaving, and a previously set, reference welding current value. In the following expression (3), the average welding current value is assumed to be average of welding current values at four points corresponding to the maximum quantity of welding state (maximum welding current values) and the minimum quantity of welding state (minimum welding current values) (L_lmax, L_lmin, L_rmax, and L_rmin) detected during the rightward weaving period and the leftward weaving period, however, the number of detection points is not limited to four, and the number of detection points may be increased or decreased in consideration of accuracy of arc-sensor control or reduction in information processing time.

$$[dI\_Lud]=[\text{reference welding current value}]-[\text{average welding current value}] \quad (3)$$

$$[\text{average welding current value}]=([L\_lmax]+[L\_lmin]+[L\_rmax]+[L\_rmin])/4$$

Horizontal Correction Amount of Leading Electrode

The horizontal correction amount of leading electrode (U_Lrl) is preferably calculated by a calculation method of the following expression (4) based on the first change amount of leading electrode (dI_Lrl) calculated by the expression (1) or (2). Here, (k_Lrl) represents a constant.

$$[U\_Lrl]=[k\_Lrl]*[dI\_Lrl] \quad (4)$$

That is, as shown in FIG. 8A, as the horizontal correction amount of leading electrode (U_Lrl), an amount is used, which is in proportion to magnitude of the first change amount of leading electrode (dI_Lrl). Furthermore, the correction amount may be calculated by a calculation method using a threshold value used in the trailing electrode control step as described later (see FIG. 8C).

Vertical Correction Amount of Leading Electrode

The vertical correction amount of leading electrode (U_Lud) is preferably calculated by a calculation method of the following expression (5) based on the second change amount of leading electrode (dI_Lud) calculated by the expression (3). Here, (k_Lud) represents a constant.

$$[U\_Lud]=[k\_Lud]*[dI\_Lud] \quad (5)$$

That is, as shown in FIG. 8B, as the vertical correction amount of leading electrode (U_Lud), an amount is used, which is in proportion to magnitude of the second change amount of leading electrode (dI_Lud). Furthermore, the correction amount may be calculated by a calculation method using a threshold value used in the trailing electrode control step as described later (see FIG. 8C).

The calculation methods of the horizontal correction amount of leading electrode and the vertical correction amount of leading electrode shown in the expressions (4) and (5) are calculation methods of correction amounts in proportion to amounts of electrical change (the first change amount of leading electrode and the second change amount of leading electrode). However, an integration term ([ki_Lrl]*Σ[dI_Lrl], [ki_Lud]*Σ[dI_Lud]) may be added in addition to a proportional term as below. Thus, deviation of displacement of the weaving center trajectory can be further reduced.

$$[U\_Lrl]=[k\_Lrl]*[dI\_Lrl]+[ki\_Lrl]*\Sigma[dI\_Lrl]$$

$$[U\_Lud]=[k\_Lud]*[dI\_Lud]+[ki\_Lud]*\Sigma[dI\_Lud]$$

(2) Trailing Electrode Control Step

In the trailing electrode control step, during one cycle of weaving, an amount of electrical change is calculated from the quantity of welding state detected in the trailing electrode, and the correction amount of trailing electrode for correcting rotational displacement of the weaving center trajectory is calculated based on the change amount of trailing electrode, and the welding torch is controlled in a rotational direction with respect to the traveling direction with the correction amount of trailing electrode (see FIG. 6). That is, the correction amount of trailing electrode is used as such a correction amount of rotation angle. In such control in the rotational direction, the welding torch 2 as a whole is rotated with the leading electrode 2a as a center. A rotation center axis may be either a straight line Y1 parallel to an axis line Y of the welding torch 2 passing through the tip of the leading electrode 2a as shown in FIG. 7A, or an axis line Y2 of the leading electrode 2a.

Change Amount of Trailing Electrode

The change amount of trailing electrode is preferably calculated by one of the following, two calculation methods.

In the first calculation method, the change amount of trailing electrode (dI_Trl) is assumed to correspond to difference between quantity of left-end welding state of the trailing electrode (T_A) detected at a left end of weaving, and quantity of right-end welding state of the trailing electrode (T_B) detected at a right end of weaving, as shown in the following expression (6).

$$[dI\_Trl]=[T\_B]-[T\_A] \quad (6)$$

In the second calculation method, the change amount of trailing electrode (dI_Trl) is assumed to correspond to difference between third difference in quantity of welding state and fourth difference in quantity of welding state, as shown in the following expression (7). The third difference in quantity of welding state is defined as difference between rightward maximum quantity of welding state (T_lmax) and rightward minimum quantity of welding state (T_lmin) of the trailing electrode, which are detected during a period of rightward weaving rw from a left end to a right end of weaving (see FIG. 3). The fourth difference in quantity of welding state is defined as difference between leftward maximum quantity of welding state (T_rmax) and leftward minimum quantity of welding state (T_rmin) of the trailing electrode, which are detected during a period of leftward weaving lw from the right end to the left end of weaving (see FIG. 3).

$$[dI\_Trl]=([T\_lmax]-[T\_lmin])-([T\_rmax]-[T\_rmin]) \quad (7)$$

Correction Amount of Trailing Electrode

The correction amount of trailing electrode (U_Trl) is preferably determined by the following conditional expression (8). That is, as shown in FIG. 8C, the correction amount is set to be zero before the change amount of trailing electrode (dI_Trl) calculated by the expression (6) or (7) exceeds a predetermined threshold value (±ΔI), and when the change amount of trailing electrode (dI_Trl) exceeds the threshold value (±ΔI), the change amount is set to be a predetermined, certain value (±ΔU).

In the case of $[dI\_Trl] > \Delta I$, $[U\_Trl] = \Delta U$, in the case of $-\Delta I \leq [dI\_Trl] \leq \Delta I$, $[U\_Trl] = 0$, and in the case of $[dI\_Trl] < -\Delta I$, $[U\_Trl] = -\Delta U$  Conditional Expression (8)

The correction amount of trailing electrode (U_Trl) may be calculated as an amount in proportion to magnitude of the change amount of trailing electrode (dI_Trl) as in the leading electrode control step. That is, the correction amount may be calculated by the following expression (9). Here, [K_Trl] is a constant.

$$[U\_Trl] = [K\_Trl] * [dI\_Trl] \qquad (9)$$

Moreover, the correction amount of trailing electrode may be obtained in a manner of combining a way of obtaining the correction amount of trailing electrode using the threshold value in the expression (8) and a way of obtaining the correction amount of trailing electrode using a proportional relationship in the expression (9).

When displacement of the weaving center trajectory includes only displacement parallel to the teaching trajectory (weld line), the welding torch is controlled in a rotational direction with respect to the travelling direction, so that the weaving center trajectory may be horizontally displaced from the teaching trajectory (weld line). Therefore, a value of the correction amount of trailing electrode (U_Trl) is preferably small compared with a value of the horizontal correction amount of leading electrode (U_Lrl). Specifically, the threshold value ($\Delta I$) in the conditional expression (8), or the constant (K_Trl) in the expression (9) is adjusted so that the correction amount of trailing electrode (U_Trl) has a small value compared with the correction amount of leading electrode (U_Lrl).

Alternatively, when the welding torch is controlled in a horizontal direction with respect to the travelling direction in the leading electrode control step, displacement in the rotational direction occurs at the same time. Therefore, the correction amount of trailing electrode (U_Trl) in the trailing electrode control step is preferably corresponding to a correction amount obtained by subtracting an amount corresponding to the displacement in the rotational direction occurring in the leading electrode control step from the correction amount of trailing electrode (U_Trl) calculated by the conditional expression (8) or the expression (9).

In the arc-sensor control method according to an embodiment of the invention, calculation methods of correction amounts in the leading electrode control step and the trailing electrode control step are preferably selected as follows.

Even in a condition that arc welding is performed to the same target position, the quantity of welding state during arc welding is not constant due to many variation factors such as an irregular short circuit, therefore variation occurs in the quantity of welding state in some degree. In the case that the variation is comparatively small, and an amount of electrical change is large with respect to displacement (a case that large electrical change is induced by small displacement), a calculation method is preferably used, the method using a proportional relationship where a correction amount is proportional to the amount of electrical change as shown in FIGS. 8A and 8B.

In the case that the variation in quantity of welding state during arc welding is comparatively large, or an amount of electrical change is small with respect to displacement (a case that small electrical change is induced even if displacement is large), a calculation method is preferably used, the method using a threshold value of the amount of electrical change to determine a correction amount as shown in FIG. 8C.

In particular, in the trailing electrode control step, in the case of a welding condition of forming a large welding bead by the leading electrode, since the trailing electrode generates arc on a molten pool formed by the leading electrode, electrical change can not appear by small displacement. Therefore, the correction amount determined by using the threshold value of the amount of electrical change (see FIG. 8C) is preferably used rather than the correction amount in proportion to the amount of electrical change (see FIGS. 8A and 8B). In the case of a welding condition where an effect of the molten pool formed by the leading electrode is small, the correction amount in proportion to the amount of electrical change (see FIGS. 8A and 8B) may be used.

To the trailing electrode, the calculation method of the second change amount of leading electrode and the calculation method of the vertical correction amount of leading electrode for the leading electrode may be further applied so that the calculation methods can be extended to accept a weld line obliquely displaced in a vertical direction.

Next, a processing flow of the arc-sensor control method is described with reference to FIGS. 1, 2 and 9. Description is made on a case as an example, wherein a welding current is used as the quantity of welding state, steps 1 to 12 are common between the leading electrode control step and the trailing electrode control step, the leading electrode control step and the trailing electrode control step are concurrently carried out, the first change amount of leading electrode and the change amount of trailing electrode are calculated using the second calculation method, the horizontal correction amount of leading electrode and the vertical correction amount of leading electrode are calculated by the calculation method using the proportional relationship, and the correction amount of trailing electrode is calculated by the calculation method using the threshold value.

(1) In steps 1 to 6 (S1 to S6), the leading electrode processing section 11a and the trailing electrode processing section 11b extract rightward maximum quantity of welding state (L_lmax, T_lmax) and rightward minimum quantity of welding state (L_lmin, T_lmin) in the leading electrode 2a and the trailing electrode 2b during rightward weaving from the quantity of welding state detected by the leading electrode detection section 6 and the trailing electrode detection section 7. Since the welding current is used as the quantity of welding state, a leading electrode detection current and a trailing electrode detection current detected at the left end of weaving correspond to the rightward maximum quantity of welding state (L_lmax, T_lmax).

(2) As the above steps, in steps 7 to 11 (S7 to S11), the sections 11a and 11b extract leftward maximum quantity of welding state (L_rmax, T_rmax) and leftward minimum quantity of welding state (L_rmin, T_rmin) in the leading electrode 2a and the trailing electrode 2b during leftward weaving from the quantity of welding state detected by the leading electrode detection section 6 and the trailing electrode detection section 7. Since the welding current is used as the quantity of welding state, a leading electrode detection current and a trailing electrode detection current detected at the right end of weaving correspond to the leftward maximum quantity of welding state (L_rmax, T_rmax).

Figure 11:
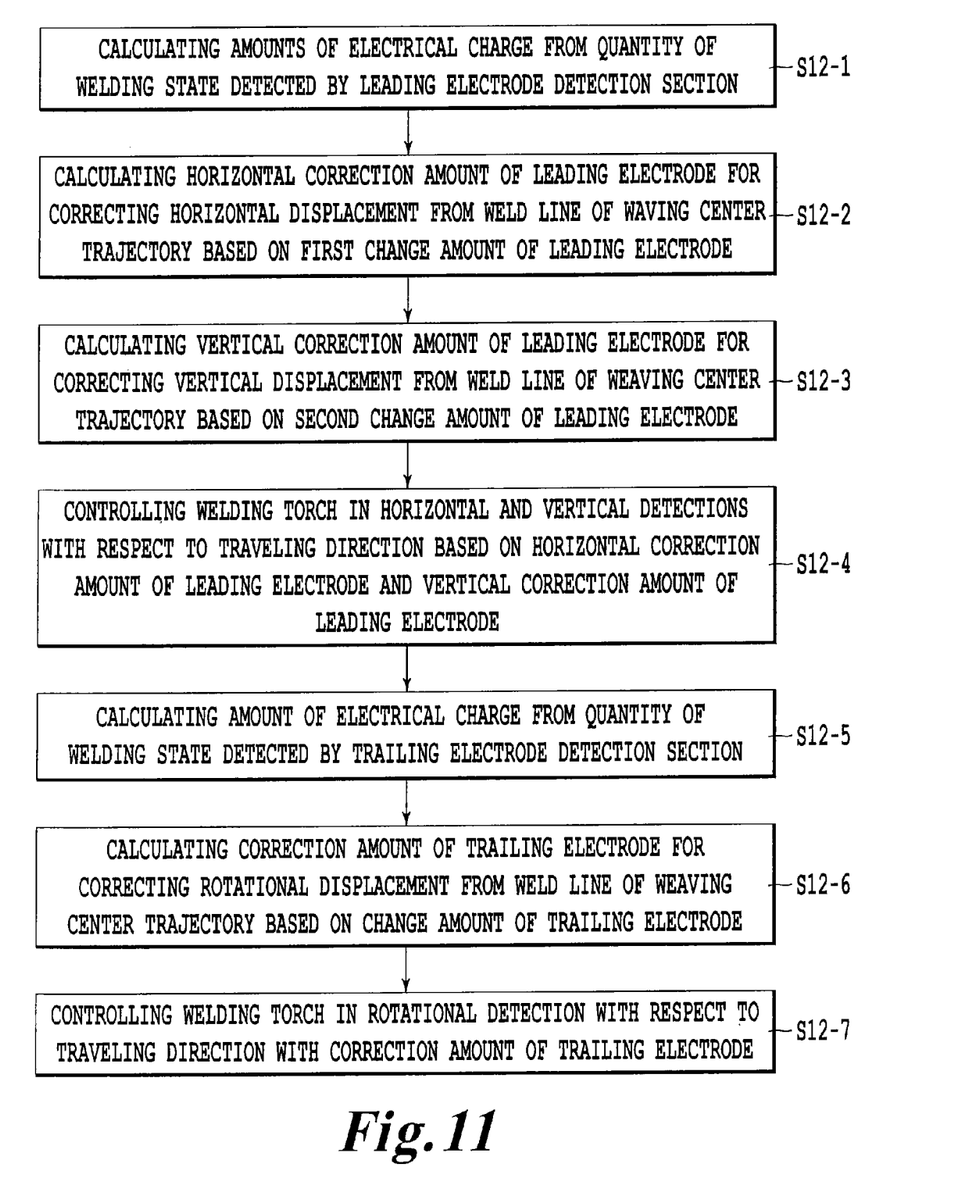
FIG. 11 is a flow chart showing the sub-steps of step S12 in FIG. 9.

(3) In step S12, the leading electrode processing section 11a and the trailing electrode processing section 11b calculate (step S12-1) the first change amount of leading electrode (dI_Lrl) using the expressing (2) from the rightward maximum quantity of welding state (L_lmax, T_lmax), rightward minimum quantity of welding state (L_lmin, T_lmin), leftward maximum quantity of welding state (L_rmax, T_rmax), and leftward minimum quantity of welding state (L_rmin, T_rmin), and calculate (step S12-5) the change amount of trailing electrode (dI_Trl) using the expression (7). Moreover, a welding current value is used as the quantity of welding state, and average quantity of welding state (average welding current value) is calculated from the rightward maximum quantity of welding state (L_lmax, T_lmax), rightward minimum quantity of welding state (L_lmin, T_lmin), leftward maximum quantity of welding state (L_rmax, T_rmax), and leftward minimum quantity of welding state (L_rmin, T_rmin), and the second change amount of leading electrode (dI_Lud) is calculated using the expression (3) from the average quantity of welding state and reference quantity of welding state (reference welding current value) being previously stored in the leading electrode processing section 11a.

Then, the leading electrode correction section 14a and the trailing electrode correction section 14b calculate (step S12-2) the horizontal correction amount of leading electrode (U_Lrl) using the expression (4) from the first change amount of leading electrode (dI_Lrl), calculate (step S12-3) the vertical correction amount of leading electrode (U_Lud) using the expression (5) from the second change amount of leading electrode (dI_Lud), and calculate (step S12-6) the correction amount of trailing electrode (U_Trl) using the expression (8) from the change amount of trailing electrode (dI_Trl).

The calculated correction amounts (U_Lrl, U_Lud, and U_Trl) are sent to the robot trajectory design processing section 13 so that a new robot operation design employing the correction amounts is obtained by a known method. The new operation design is sent to the robot 3, thereby arc-sensor control is carried out (steps S12-4 and S12-7), by which the welding torch 2 are controlled in horizontal, vertical, and rotational directions with respect to the travelling direction. Such arc-sensor control is carried out in each cycle of weaving, thereby arc welding can be performed, which is excellent in accuracy of arc-sensor control, and hardly produces welding defects.

In the case of using the first calculation method for calculating the first change amount of leading electrode and the change amount of trailing electrode, the rightward maximum quantity of welding state (L_lmax, T_lmax) corresponds to the quantity of left end welding state (L_A, T_A), and the leftward maximum quantity of welding state (L_rmax, T_rmax) corresponds to the quantity of right end welding state (L_B, T_B).

When a welding voltage is used as the quantity of welding state, and the second calculation method is used for calculation, welding voltages detected at the left end of weaving in the steps 4 and 9 (S4 and S9) correspond to the rightward minimum quantity of welding state (L_lmin, T_lmin), and welding voltages detected at the right end of weaving correspond to the leftward minimum quantity of welding state (L_rmin, T_rmin). In the steps 3 and 8 (S3 and S8), whether a detection voltage is maximum or not is determined.

When the welding voltage is used as the quantity of welding state, and the first calculation method is used for calculation, the welding voltages (L_lmin, T_lmin) detected at the left end of weaving correspond to the quantity of left end welding state (L_A, T_A), and the welding voltages (L_rmin, T_rmin) detected at the right end of weaving correspond to the quantity of right end welding state (L_B, T_B).

What is claimed is:

1. A robot control unit for controlling a position of a welding torch in a tandem arc welding system, the welding torch having a leading electrode and a trailing electrode at a tip of the torch, wherein the robot weaves the welding torch right and left with respect to a travelling direction of welding, and a leading electrode power supply and a trailing electrode power supply are provided for supplying power to the leading electrode and the trailing electrode to perform arc welding along a weld line, the robot control unit comprising:
   a leading electrode detection section for detecting a quantity of a welding state during weaving of the leading electrode;
   a trailing electrode detection section for detecting a quantity of the welding state during weaving of the trailing electrode;
   a leading electrode processing section for calculating amounts of electrical change from the quantity of the welding state detected by the leading electrode detection section;
   a leading electrode correction means for calculating correction amounts for correcting a displacement in horizontal and vertical directions from the weld line of a weaving center trajectory to reduce the deviation of displacement of the weaving center trajectory, based on the amounts of electrical change calculated by the leading electrode processing section;
   a trailing electrode processing section for calculating an amount of electrical change from the quantity of the welding state detected by the trailing electrode detection section; and
   a trailing electrode correction means for calculating a correction amount for correcting a displacement in a rotational direction from the weld line of the weaving center trajectory to reduce the deviation from the weaving center trajectory, based on the amount of electrical change calculated by the trailing electrode processing section.

2. An arc-sensor control method using the robot control unit according to claim 1, comprising the steps of:
   a leading electrode control step performed in the leading electrode processing section during one cycle of weaving to reduce the deviation of displacement of the weaving center trajectory, comprising steps of calculating amounts of electrical change from the quantity of the welding state detected by the leading electrode detection section, calculating a horizontal correction amount of the leading electrode for correcting horizontal displacement from the weld line of a weaving center trajectory based on a first change amount of leading electrode, and a vertical correction amount of the leading electrode for correcting vertical displacement from the weld line of the weaving center trajectory based on a second change amount of leading electrode, and controlling the welding torch in horizontal and vertical directions with respect to the travelling direction based on the horizontal correction amount of the leading electrode and the vertical correction amount of the leading electrode; and
   a trailing electrode control step, performed in the trailing electrode processing section concurrently with or following the leading electrode control step during the one cycle of weaving to reduce the deviation from the weaving center trajectory, comprising steps of calculating an amount of electrical change from the quantity of the welding state detected by the trailing electrode detection section, calculating a correction amount of the trailing electrode for correcting a rotational displacement from the weld line of the weaving center trajectory based on the change amount of the trailing electrode, and controlling the welding torch in a rotational direction with respect to the travelling direction with the correction amount of the trailing electrode.

3. The arc-sensor control method according to claim 2:
   wherein, in the leading electrode control step, a welding current value is used as the quantity of the welding state, and the second change amount of the leading electrode corresponds to difference between an average welding current value of the leading electrode detected during one cycle of weaving and a previously set reference welding current value.

4. The arc-sensor control method according to claim 2:
wherein, in the leading electrode control step, the first change amount of the leading electrode corresponds to a difference between a quantity of a left end welding state of the leading electrode detected at a left end of weaving, and quantity of a right end welding state of the leading electrode detected at a right end of weaving.

5. The arc-sensor control method according to claim 2:
wherein, in the leading electrode control step, the first change amount of the leading electrode corresponds to a difference between a first difference in quantity of the welding state and a second difference in quantity of the welding state, and
the first difference in quantity of the welding state is defined as the difference between a rightward maximum quantity of the welding state and a rightward minimum quantity of the welding state of the leading electrode, which are detected during a rightward weaving period from a left end to a right end of weaving, and
the second difference in quantity of the welding state is defined as the difference between a leftward maximum quantity of the welding state and leftward minimum quantity of the welding state of the leading electrode, which are detected during a leftward weaving period from the right end to the left end of weaving.

6. The arc-sensor control method according to claim 2:
wherein, in the trailing electrode control step, the change amount of the trailing electrode corresponds to the difference between a quantity of left end welding state of the trailing electrode detected at a left end of weaving, and a quantity of right end welding state of the trailing electrode detected at a right end of weaving.

7. The arc-sensor control method according to claim 2:
wherein, in the trailing electrode control step, the change amount of the trailing electrode corresponds to the difference between a third difference in quantity of the welding state and a fourth difference in quantity of the welding state, and
the third difference in quantity of the welding state is defined as the difference between a rightward maximum quantity of the welding state and a rightward minimum quantity of the welding state of the trailing electrode, which are detected during a rightward weaving period from a left end to a right end of weaving, and
the fourth difference in quantity of the welding state is defined as a difference between a leftward maximum quantity of the welding state and a leftward minimum quantity of the welding state of the trailing electrode, which are detected during a leftward weaving period from the right end to the left end of weaving.

8. The arc-sensor control method according to claim 2:
wherein, in the leading electrode control step, the vertical correction amount of the leading electrode is in proportion to magnitude of the second change amount of the leading electrode.

9. The arc-sensor control method according to claim 2:
wherein, in the leading electrode control step, the horizontal correction amount of the leading electrode is in proportion to magnitude of the first change amount of the leading electrode.

10. The arc-sensor control method according to claim 2:
wherein, in the trailing electrode control step, the correction amount of the trailing electrode is in proportion to a magnitude of the change amount of the trailing electrode.

11. The arc-sensor control method according to claim 2:
wherein, in the leading electrode control step, the vertical correction amount of the leading electrode is set to be zero before the second change amount of leading electrode exceeds a predetermined threshold value, and the vertical correction amount is set to be a predetermined, certain amount when the second change amount of the leading electrode exceeds the predetermined threshold value.

12. The arc-sensor control method according to claim 2:
wherein, in the leading electrode control step, the horizontal correction amount of the leading electrode is set to be zero before the first change amount of the leading electrode exceeds a predetermined threshold value, and the horizontal correction amount is set to be a predetermined, certain amount when the first change amount of the leading electrode exceeds the predetermined threshold value.

13. The arc-sensor control method according to claim 2:
wherein, in the trailing electrode control step, the correction amount of the trailing electrode is set to be zero before the change amount of the trailing electrode exceeds a predetermined threshold value, and the correction amount is set to be a predetermined, certain amount when the change amount of the trailing electrode exceeds the predetermined threshold value.

* * * * *